US012638826B2

(12) United States Patent
Irie et al.

(10) Patent No.: US 12,638,826 B2
(45) Date of Patent: May 26, 2026

(54) POST-PROCESSOR DEVELOPMENT SUPPORT DEVICE, POST-PROCESSOR DEVELOPMENT SUPPORT SYSTEM, AND COMPUTER-EXECUTABLE METHOD

(71) Applicant: FANUC CORPORATION, Yamanashi (JP)

(72) Inventors: Kouhei Irie, Yamanashi (JP); Jirou Fujiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 403 days.

(21) Appl. No.: 18/005,967

(22) PCT Filed: Aug. 3, 2021

(86) PCT No.: PCT/JP2021/028757
§ 371 (c)(1),
(2) Date: Jan. 19, 2023

(87) PCT Pub. No.: WO2022/030485
PCT Pub. Date: Feb. 10, 2022

(65) Prior Publication Data
US 2023/0315051 A1 Oct. 5, 2023

(30) Foreign Application Priority Data
Aug. 6, 2020 (JP) ................................. 2020-134027

(51) Int. Cl.
*G05B 19/4155* (2006.01)
*G05B 19/409* (2006.01)

(52) U.S. Cl.
CPC ....... *G05B 19/4155* (2013.01); *G05B 19/409* (2013.01)

(58) Field of Classification Search
None
See application file for complete search history.

(56) References Cited

U.S. PATENT DOCUMENTS 9,436,176 B2 * 9/2016 Nakamura ......... G05B 19/4061
9,529,352 B2 * 12/2016 Iuchi .................... G05B 19/402
(Continued)

FOREIGN PATENT DOCUMENTS

CN    105051630 A    11/2015
JP    H5-46228 A    2/1993
(Continued)

OTHER PUBLICATIONS

International Search Report in PCT/JP2021/028757, mailed Oct. 19, 2021, 2pp.

*Primary Examiner* — Hua Lu
(74) *Attorney, Agent, or Firm* — HAUPTMAN HAM, LLP

(57) ABSTRACT
In order to support setting in post-processor development, internal information of a numerical controller is acquired, a basic function usable by the numerical controller is extracted based on system information or parameter information, which is the acquired internal information, and the extracted function is output to a post-processor as a configuration file. The post-processor creates a machining program for the numerical controller by referring to the function set in the configuration file.

9 Claims, 8 Drawing Sheets

<u>100</u>

(56) References Cited

U.S. PATENT DOCUMENTS

| 2005/0102054 | A1* | 5/2005 | Dolansky | ........... | G05B 19/4069 |
| | | | | | 700/182 |
| 2006/0036394 | A1* | 2/2006 | Chen | ............. | G01R 31/318511 |
| | | | | | 702/123 |
| 2007/0150087 | A1* | 6/2007 | Tang | .................... | B29C 70/386 |
| | | | | | 700/119 |
| 2009/0326892 | A1* | 12/2009 | Lin | ........................ | G05B 17/02 |
| | | | | | 700/86 |
| 2014/0200708 | A1* | 7/2014 | Rollet | ..................... | B23H 7/18 |
| | | | | | 700/162 |
| 2015/0127139 | A1* | 5/2015 | Bolin | ................. | G05B 19/4065 |
| | | | | | 700/173 |
| 2015/0205283 | A1* | 7/2015 | Brand | ............. | G05B 19/40937 |
| | | | | | 700/186 |
| 2015/0355621 | A1* | 12/2015 | Ikeda | .................... | G05B 19/18 |
| | | | | | 700/159 |
| 2016/0103438 | A1* | 4/2016 | Rieger | ................ | G05B 19/409 |
| | | | | | 700/160 |

| 2017/0308057 | A1* | 10/2017 | Kreidler | .......... | G05B 19/41875 |
| 2017/0308058 | A1* | 10/2017 | Kreidler | ............ | G05B 19/4163 |
| 2018/0259935 | A1* | 9/2018 | Saitou | ................ | G05B 19/4097 |
| 2019/0129389 | A1* | 5/2019 | Saitou | ............. | G05B 19/40937 |
| 2019/0210217 | A1* | 7/2019 | Jetté | ....................... | B25J 9/0069 |
| 2019/0384262 | A1* | 12/2019 | Saitou | ............... | G05B 19/4068 |
| 2021/0362225 | A1* | 11/2021 | Yun | ........................ | B22F 12/90 |
| 2022/0063016 | A1* | 3/2022 | Gabilondo | ......... | B23K 26/0626 |
| 2022/0244706 | A1* | 8/2022 | Sueda | .................. | G05B 19/414 |
| 2022/0260964 | A1* | 8/2022 | Mori | .................. | G05B 19/408 |
| 2023/0244206 | A1* | 8/2023 | Bretschneider | .. | G05B 19/40938 |
| | | | | | 700/160 |

FOREIGN PATENT DOCUMENTS

| JP | 2005-174010 A | 6/2005 |
| JP | 2008059518 A | 3/2008 |
| JP | 2014085781 A | 5/2014 |
| KR | 10-2005-0008207 A | 1/2005 |

* cited by examiner

| PERFORMANCE IMPROVEMENT EFFECT | SIMILAR FUNCTIONS IN RIGID TAP RELATIONSHIP | |
|---|---|---|
| PERFORMANCE IMPROVEMENT EFFECT | SIMILAR FUNCTIONS IN SMOOTHING RELATIONSHIP | |
| HIGH | G200  Q3 (SMOOTHING FUNCTION A) | |
| MEDIUM | G200  Q2 (SMOOTHING FUNCTION B) | |
| LOW | G200  Q1 (SMOOTHING FUNCTION C) | |

| |
|---|
| G200  Q3 (SMOOTHING FUNCTION A) |
| G200  Q2 (SMOOTHING FUNCTION B) |
| G200  Q1 (SMOOTHING FUNCTION C) |

TOOL ROTATION TYPE

TABLE ROTATION TYPE

MIXED TYPE

POST-PROCESSOR DEVELOPMENT SUPPORT DEVICE, POST-PROCESSOR DEVELOPMENT SUPPORT SYSTEM, AND COMPUTER-EXECUTABLE METHOD

RELATED APPLICATIONS

The present application is a National Phase of International Application No. PCT/JP2021/028757 filed Aug. 3, 2021, which claims priority to Japanese Application No. 2020-134027 filed Aug. 6, 2020.

TECHNICAL FIELD

The present invention relates to a post-processor development support device, a post-processor development support system, and a computer-executable method.

BACKGROUND ART

Conventionally, CAD (Computer Aided Design) or CAM (Computer Aided Manufacturing) has been used to create machining programs for numerical controllers.

The CAD is a system for design using a computer, and creates and edits the appearance or internal structure of a processed product, the arrangement of parts or members, and the like and displays a cutter location or the shape change of the processed product due to cutting in a three-dimensional manner.

The CAM is mainly configured to include a main processor and a post-processor. The main processor calculates cutter location (CL) data on the model coordinate system created by CAD, and the post-processor converts the CL data into a machining program. More specifically, the post-processor converts the CL data calculated in the model coordinate system into the machine coordinate system, and adds the feed speed, the number of revolutions of the spindle, various macros, and the like to create an appropriate machining program. At this time, since the post-processor creates a machining program that matches the specifications of the numerical controller or the structure of the machine tool, it is necessary to set information regarding the specifications of the numerical controller or the structure of the machine tool in advance.

In one conventional example of the post-processor development support system, an OPT file is created for each numerical controller such as "axis configuration" and "rotation axis", FIL macros created corresponding to "classification A" (start pattern, machining origin setting pattern, tool change pattern, and the like) and "classification B" (fixed output pattern such as MODE setting, reference point return pattern, tool change and next tool standby, and the like) are created, and a machining program is selected from the content of the OPT file and the FIL file (see, for example, Patent Document 1).

In this post-processor development support system, when the user selects a type of axis configuration and the post-processor development system selects one OPT file based on the type of axis configuration, the post-processor creation unit automatically defines the basic settings specified in the OPT file in the post-processor.

Then, for each classification item, when the user selects an option and the post-processor development support system selects a FIL macro based on the option, the post-processor creation unit automatically defines the detailed settings specified in the FIL macro in the post-processor.

CITATION LIST

Patent Document

Patent Document 1: JP 2008-59518 A

SUMMARY OF THE INVENTION

Problem to be Solved by the Invention

In the post-processor development support system of Patent Document 1, the user selects the type of axis configuration and selects the classification item of the FIL macro to set the structure of the machine tool.

However, the settings of the numerical controller vary greatly depending on a machine tool to be controlled, a tool to be used, a material to be processed, and the like. The main computer of the CAM calculates the cutter location, but in order to create a machining program for actually operating the machine tool on the cutter location, correct information of the machine tool to be controlled, the tool to be used, the material to be processed, and the like should be set in the post-processor.

In addition, the post-processor developer sets available functions based on the specifications of the numerical controller or the structure of the machine tool. Taking the G code as a specific example, G codes that can be used in the current machine configuration or numerical controller are manually set. To set up available G codes, the post-processor developer visually checks the parameters of the numerical controller or the options of the numerical controller, and sends a questionnaire to the user of the numerical controller if questions remain unresolved. The questionnaire describes G codes that can be used in the machine to be controlled, machine configuration, axis information, and the like. The post-processor developer sets available G codes with reference to the answers from the numerical controller engineer.

When setting G codes manually, it is difficult to set all G codes reliably. If there is any omission in the setting of G codes, the machining performance of the numerical controller cannot be fully demonstrated. In addition, the latest G code may not be familiar to developers, and the latest functions cannot be used unless the G code is set.

If the machine configuration of the machine tool or the function that can be used in the machine tool can be set accurately without omission, the burden on the developer can be reduced and the functions of the numerical controller can be fully demonstrated.

In the field of post-processor development, there is a demand for a technique of supporting the settings.

Means for Solving Problem

A post-processor development support device, which is one aspect of the present disclosure, includes: an internal information acquisition unit for acquiring internal information of a numerical controller; a function extraction unit for extracting a function usable by the numerical controller based on the internal information acquired by the internal information acquisition unit; and a file output unit for outputting the function extracted by the function extraction unit to a post-processor as a configuration file.

A post-processor development support system, which is one aspect of the present disclosure, includes: an internal information acquisition unit for acquiring internal information of a numerical controller; a function extraction unit for extracting a function usable by the numerical controller based on the internal information acquired by the internal information acquisition unit; and a file output unit for outputting the function extracted by the function extraction unit to a post-processor as a configuration file.

A computer-executable method, which is one aspect of the present disclosure, includes: acquiring internal information of numerical control information; extracting a function usable by the numerical controller based on the acquired internal information; and outputting the extracted function to a post-processor as a configuration file.

Effect of the Invention

According to the present disclosure, it is possible to support the setting of the post-processor.

BRIEF DESCRIPTION OF DRAWINGS

FIG. 6 is a diagram for explaining the processing of a function comparison unit;

MODE(S) FOR CARRYING OUT THE INVENTION

[First Disclosure]

Figure 1:
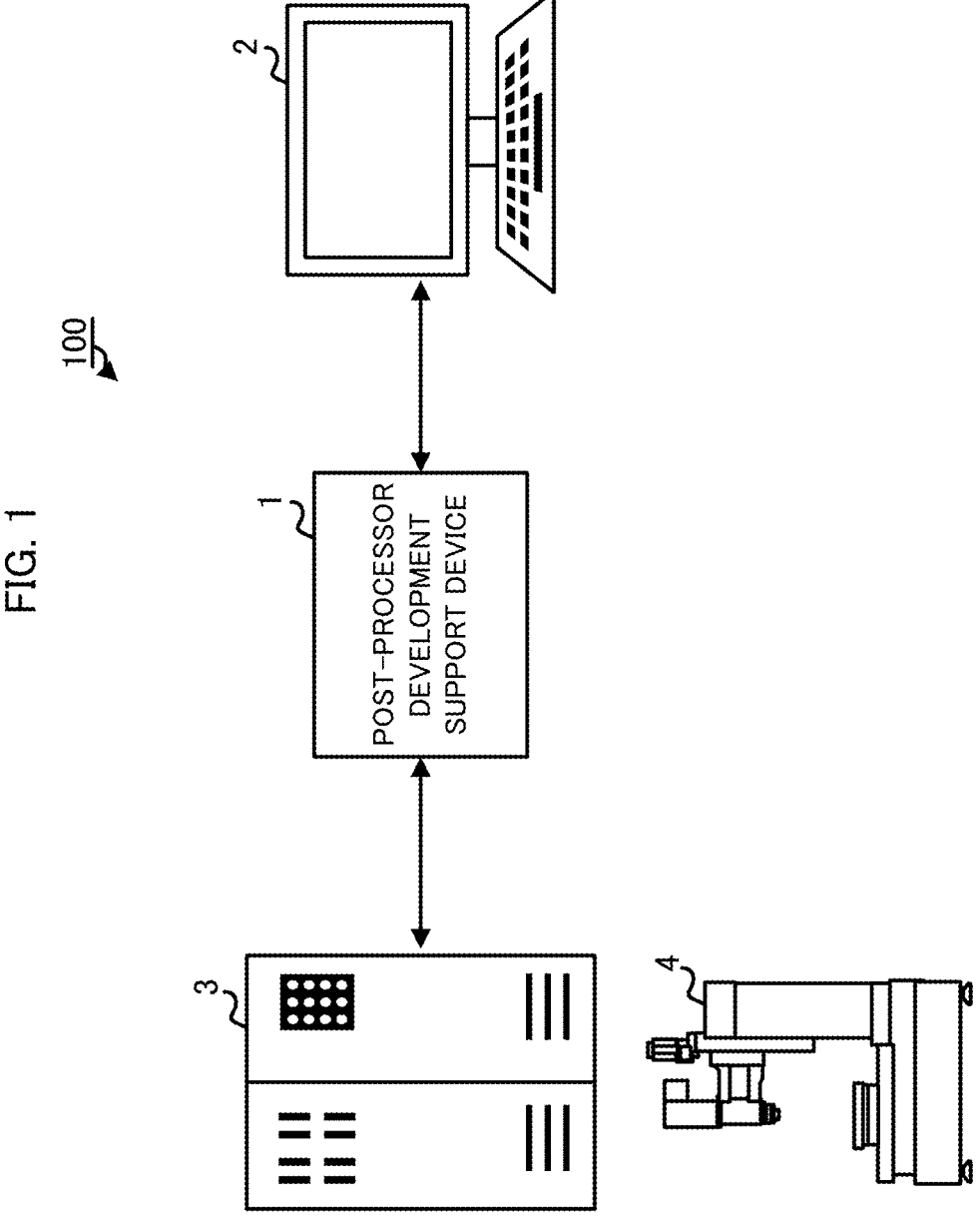
FIG. 1 is a conceptual diagram of a post-processor development support system of the present disclosure.

Hereinafter, a post-processor development support system 100 of a first disclosure will be described. FIG. 1 shows an example of the post-processor development support system 100. The post-processor development support system 100 has a PC (Personal Computer) 2 including a CAM 21, a numerical controller 3 that controls a machine tool 4, and a post-processor development support device 1 that supports the development of a post-processor.

Figure 2:
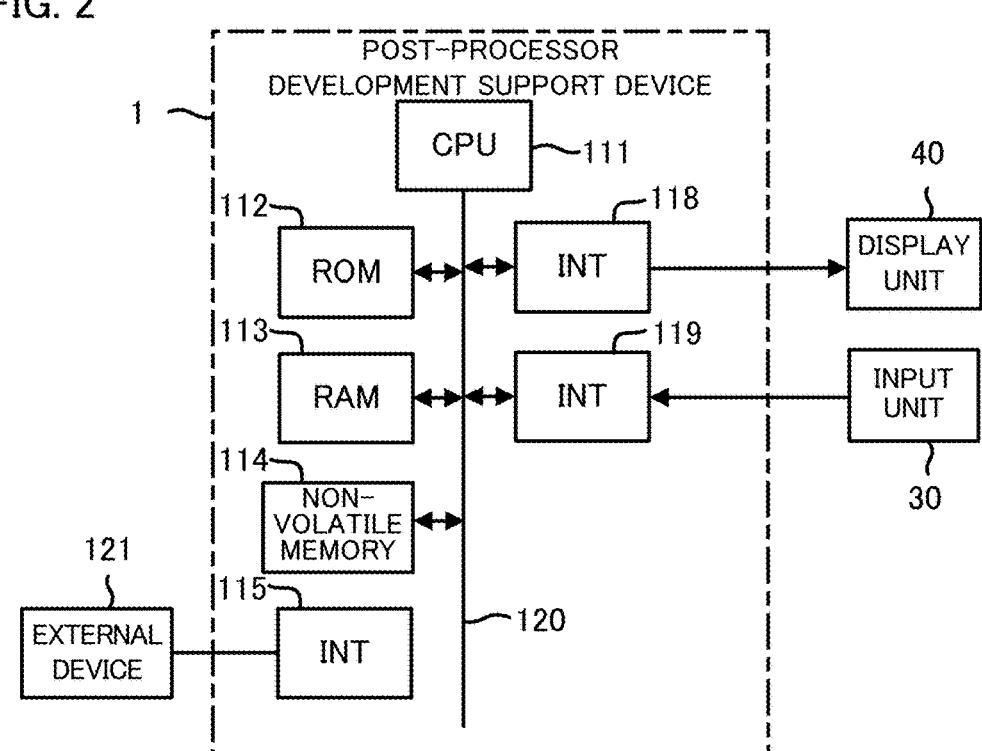
FIG. 2 is a hardware configuration diagram of a post-processor development support device.

FIG. 2 is a hardware configuration diagram of the post-processor development support device 1. As shown in FIG. 2, the post-processor development support device 1 includes a CPU 111 that performs overall control of the post-processor development support device 1, a ROM 112 that records programs or data, and a RAM 113 for temporarily loading data. The CPU 111 reads a system program recorded in the ROM 112 through a bus 120, and performs overall control of the post-processor development support device 1 according to the system program.

A non-volatile memory 114 is, for example, backed up by a battery (not shown), so that the storage state is maintained even when the power of the post-processor development support device is turned off. Programs read from an external device 121 through interfaces 115 and 119, a user operation input through an input unit 30, internal information acquired from each unit of the post-processor development support device 1 or the numerical controller 3, and the like are stored in the non-volatile memory 114.

An interface 115 is the interface 115 for connecting the post-processor development support device 1 to the external device 121, such as an adapter. Programs, various parameters, and the like are read from the external device 121 side. In addition, programs, various parameters, and the like edited in the post-processor development support device 1 can be stored in an external storage means (not shown) through the external device 121.

The post-processor development support device 1 is connected to a display unit 40 through an interface 118. The post-processor development support device 1 extracts the functions of the numerical controller 3. The function extraction program may be stored in the non-volatile memory 114, stored in an external recording means, or acquired through a network. The processing of the present disclosure is realized by the CPU 111 of the post-processor development support device 1 executing the program.

Figure 3:
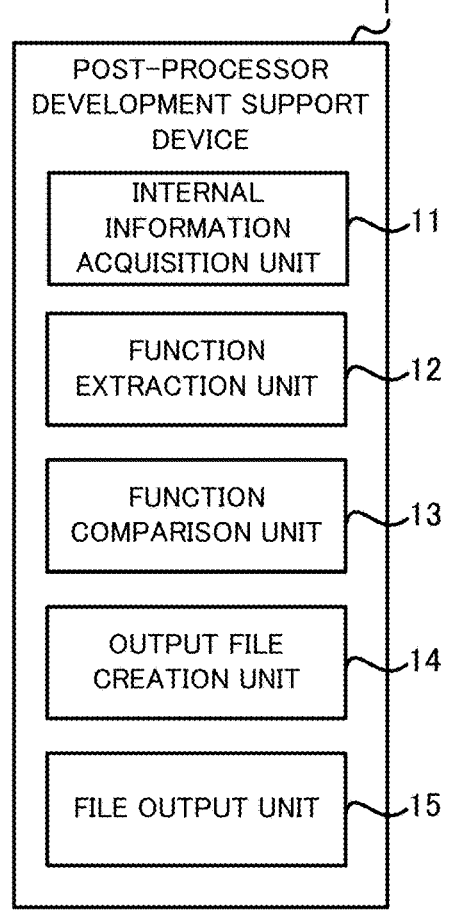
FIG. 3 is a block diagram of the post-processor development support device.

FIG. 3 is a block diagram of the post-processor development support device 1.

The post-processor development support device 1 includes an internal information acquisition unit 11 that acquires internal information of the numerical controller 3, a function extraction unit 12 that extracts the functions of the numerical controller 3 based on the acquired internal information, a function comparison unit 13 that compares the extracted functions with each other, an output file creation unit 14 that creates a configuration file summarizing the functions of the numerical controller 3, and a file output unit 15 that outputs the created configuration list to a PC.

The internal information acquisition unit 11 acquires information stored inside the numerical controller 3 (hereinafter, referred to as internal information). The internal information includes information regarding the numerical controller 3 itself and information set in accordance with the machine tool 4 to be controlled.

The internal information includes system information of the numerical controller 3, parameter information of the machine tool 4, option information of the numerical controller 3, ladder programs of the numerical controller 3, and the like.

The system information of the numerical controller 3 is information regarding the numerical controller 3 itself. The system information includes specifications of the numerical controller 3 itself, information on specs, and the like. For example, version information of the numerical controller 3, basic hardware configuration such as the CPU and the memory of the numerical controller 3, and the like are included in the system information.

The parameter information of the machine tool 4 includes the machine configuration or axis configuration of the machine tool 4, the feed speed of the tool, the number of revolutions of the spindle, and the like, and is stored in the memory region of the numerical controller 3. The parameter information of the machine tool 4 is set by an engineer in accordance with the machine tool 4 to be controlled. Therefore, the parameter information of the machine tool 4 differs depending on the machine tool 4 connected to the numerical controller 3.

The option information is information regarding options added to the numerical controller 3. The numerical controller 3 has basic functions and optional functions to be added. Optional functions are selected by the user of the numerical controller 3 and added to the basic functions. Which option is added differs for each numerical controller 3.

The ladder program is a program for controlling a programmable logic controller (PLC) in the numerical controller 3. An instruction called an M code is described in a machining program created by a post-processor 23. The M code is an auxiliary function of the numerical controller 3 used in the machining program. The M code is output from the numerical controller 3 to the PLC, and controls mechanical phenomena or operations surrounding the machine tool, such as the jig of the machine tool 4, solenoid valve ON/OFF, limit switch status checking, spindle rotation, and coolant discharge.

Since the ladder program corresponding to the M code is created by the engineer of the numerical controller 3, how the machine operates for a certain M code number differs depending on the numerical controller 3. Some M codes, such as M03 (rotate the spindle forward), are routinely used, but the M code programmed by the engineer with a ladder differs for each numerical controller 3.

The function extraction unit 12 extracts functions that can be used by the numerical controller 3 based on the acquired internal information.

The function extraction unit 12 extracts environmental information indicating which numerical controller 3 controls which machine tool 4 from the parameter information of the machine tool 4 or the version of the numerical controller 3.

The function extraction unit 12 extracts basic functions from the environmental information of the numerical controller 3 and the machine tool 4, and further extracts optional added functions.

When extracting optional added functions from the option information, if two or more extracted options have exclusive functions, the function extraction unit 12 enables only one of the optional functions and disables the remaining optional functions. Which option is to be enabled may not be determined by the function extraction unit 12 and may be selected by the user. The function extraction unit 12 creates a list of available functions based on the option information. Functions can be extracted by using a function or a table.

When similar functions are extracted by the function extraction unit 12, the function comparison unit 13 selects an appropriate function among the similar functions. The appropriate function differs depending on the set conditions. For example, assuming that the performance improvement effect is the selection conditions of the function, a function with the highest performance improvement effect is selected from a plurality of similar functions. In addition, there is a case where a function with a short processing time or a function with low power consumption is required. The setting conditions may be selectable by the user or may be fixed in advance.

The output file creation unit 14 converts the list of functions extracted by the function extraction unit 12 or the list of functions selected by the function comparison unit 13 into a file in a format readable by the post-processor 23. This file is called a configuration file of the post-processor 23. The configuration file format is not particularly limited as long as this can be read by the post-processor 23.

General-purpose formats, such as XML (Extensive Markup Language), CSV (Comma Separated Value), TXT (text), and JSON (JavaScript Object Notation), can be read by most information processing apparatuses. As will be described later, when the post-processor development support device 1 is mounted in the PC 2 including the CAM 21, processing is performed internally without requiring a network. Therefore, the format of the configuration file does not need to be a general-purpose format.

The file output unit 15 outputs the configuration file created by the output file creation unit 14 to the PC 2. For the output of the configuration file, a wired/wireless network may be used, or a non-volatile memory such as a USB memory may be used.

In addition, as will be described later, when the post-processor development support device 1 is mounted in the PC 2 including the CAM 21, the data is output internally without requiring a network.

Figure 4:
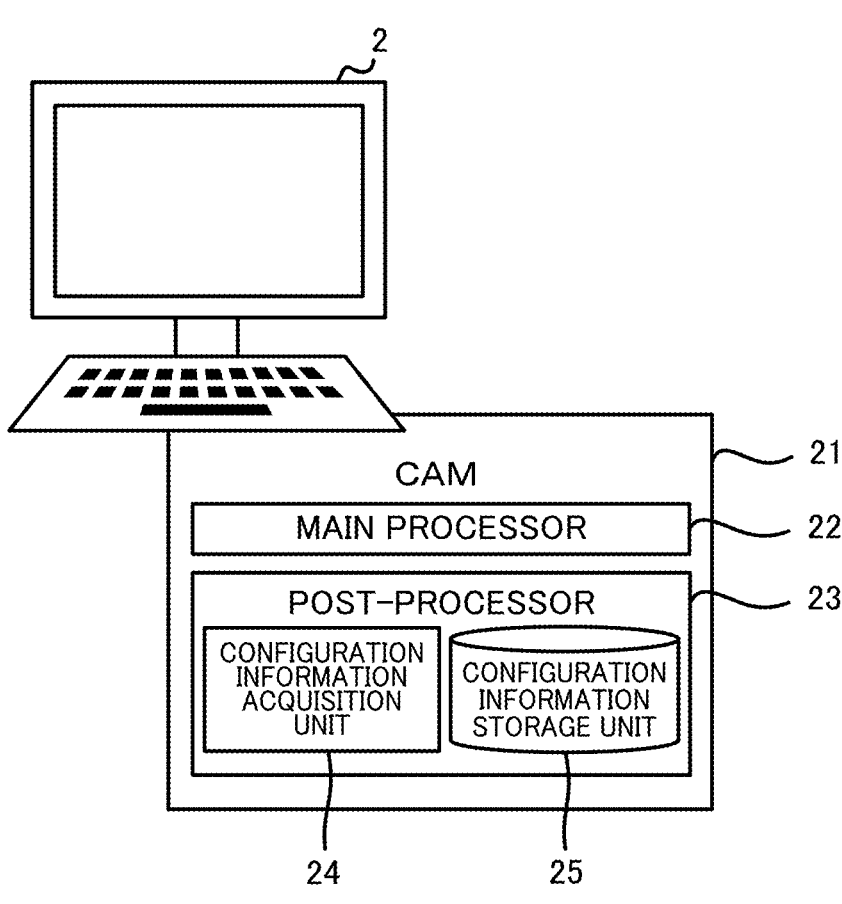
FIG. 4 is a block diagram of a PC with a built-in CAM.

FIG. 4 is a block diagram of the PC 2 in which the CAM 21 is built.

The PC 2 includes a CAD and the CAM 21, or includes at least only the CAM 21. The CAD is a system for design using a computer. The CAD creates and edits the appearance or internal structure of a processed product, the arrangement of parts or members, and the like and displays a cutter location or the shape change of the processed product due to cutting in a three-dimensional manner.

The CAM 21 includes a main processor 22 that calculates cutter location data (CL data) on a model coordinate system created by the CAD and the post-processor 23 that converts the CL data into a machining program.

The post-processor 23 includes a configuration information acquisition unit 24 that acquires a configuration file from the post-processor development support device 1 and a configuration information storage unit 25 that stores the content of the configuration file. The configuration file includes a list of available functions. The post-processor 23 creates a machining program from the CL data based on these configuration files.

Figure 5:
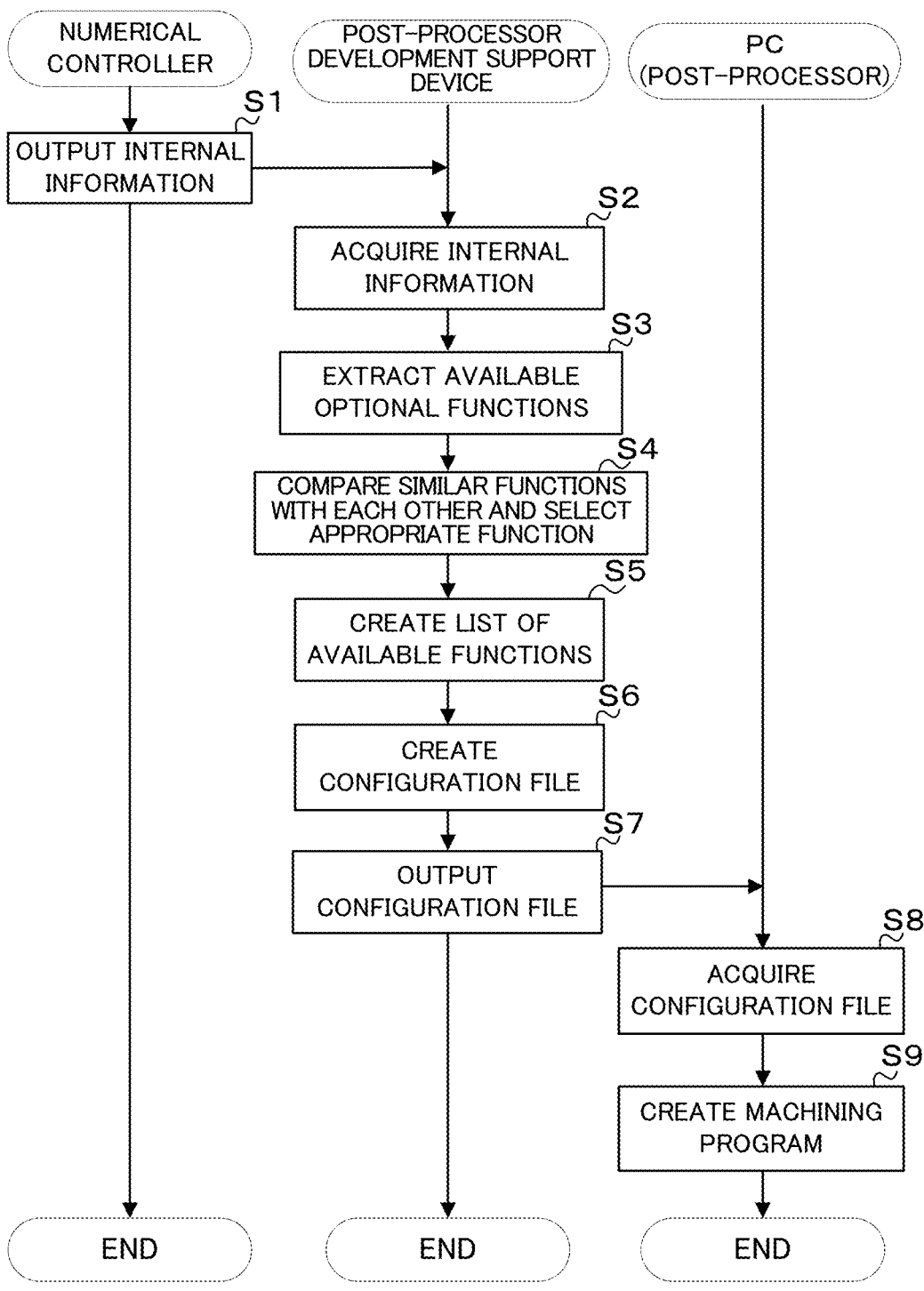
FIG. 5 is a flowchart for explaining the operation of the post-processor development support system.

The operation of the post-processor development support system 100 will be described with reference to the flowchart of FIG. 5.

The numerical controller 3 outputs internal information to the post-processor development support device 1 (step S1). When the internal information is acquired (step S2), the post-processor development support device 1 grasps the environment of the numerical controller 3 or the machine tool 4 to extract available basic functions and extracts available optional functions with reference to the option information (step S3). When a plurality of similar functions are extracted in step S3, the post-processor development support device 1 compares the similar functions with each other and selects an appropriate function among the similar functions (step S4). After selecting the appropriate function in step S4, the post-processor development support device 1 creates a list of available functions (step S5). The post-processor development support device 1 converts the created list into a general-purpose format or the like to create a configuration file readable by the PC 2 (step S6). The post-processor development support device 1 outputs the configuration file to the PC 2 including the post-processor 23 (step S7).

When the configuration file is acquired (step S8), the PC 2 creates a machining program by using the functions described in the configuration file (step S9).

As described above, the post-processor development support system 100 of the first disclosure can set the functions that can be used by the numerical controller 3 without omission by acquiring the internal information of the numerical controller 3, extracting the functions that can be used by the numerical controller 3 based on the acquired internal information, and outputting the extracted functions to the post-processor 23.

The functions that can be used by the numerical controller 3 differ depending on the model of the numerical controller 3. In addition, it is very troublesome to specify the functions that can be used by the numerical controller 3 in consideration of the background of which option is added to the numerical controller 3, what function is included in the added option, and which function and which function have an exclusive relationship.

In the post-processor development support system 100 of the present disclosure, by automatically extracting the functions that can be used by the numerical controller 3, it is possible to reduce the burden on the developer of the post-processor and reduce human errors, and new functions added according to the version or options of the numerical controller 3 can be set without omission.

[Second Disclosure]

As a second disclosure, a specific example of processing of the function comparison unit 13 will be described. The function comparison unit 13 has a list table of similar functions. As shown in FIG. 6, the list table of similar functions is classified by similar functions, such as "similar functions in smoothing relationship" and "similar functions in rigid tap relationship". "Similar functions in smoothing relationship" include "smoothing function A", "smoothing function B", and "smoothing function C". "Performance improvement effect" is given to each function. The "performance improvement effect" is "high" in the case of "smoothing function A", the "performance improvement effect" is "medium" in the case of "smoothing function B", and the "performance improvement effect" is "low" in the case of "smoothing function C". In addition, a G code for giving an instruction to execute a function on the machining program is described. For example, the G code for "smoothing function A" is "G200 Q3", the G code for "smoothing function B" is "G200 Q2", and the G code for "smoothing function C" is "G200 Q1".

In addition, FIG. 6 shows a list of available functions extracted by the function extraction unit 12. The function comparison unit 13 compares the list of available functions with a list table of similar functions. When similar functions are included in the available functions, the function comparison unit 13 selects a function with the highest "performance improvement effect", among the similar functions, with reference to the "performance improvement effect" in the list table of similar functions.

In the example of FIG. 6, "smoothing function A" and "smoothing function B", which are "similar functions in smoothing relationship", are included in the list of available functions. Referring to the list table of similar functions, the "performance improvement effect" is "high" in the case of "smoothing function A", and the "performance improvement effect" is "medium" in the case of "smoothing function B". The function comparison unit 13 selects the "smoothing function A" with the "performance improvement effect" of "high" as an appropriate function.

[Third Disclosure]

Figure 7:
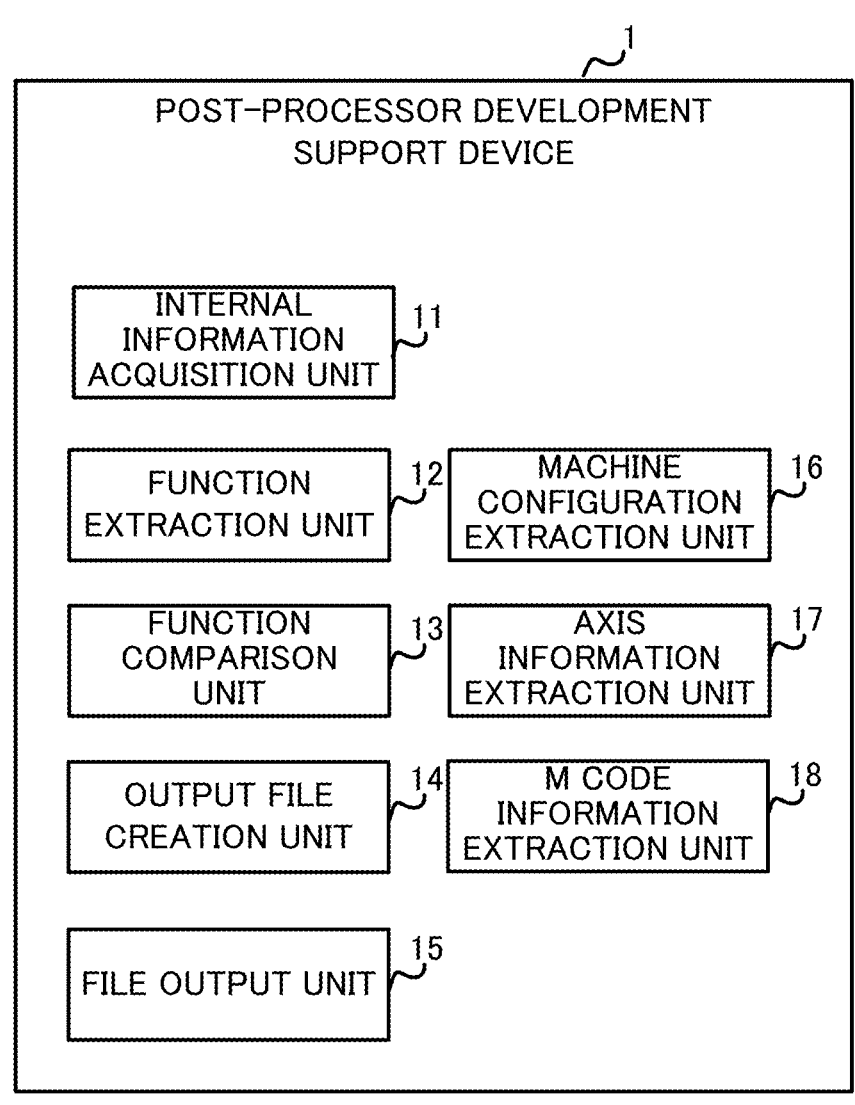
FIG. 7 is a block diagram of a post-processor development support device of a third disclosure.

The post-processor development support device 1 of a third disclosure has a function of outputting information, such as machine configuration, axis information, and M code, to the CAM 21. FIG. 7 is a block diagram of the post-processor development support device 1 of the third disclosure. The post-processor development support device 1 shown in FIG. 7 includes a machine configuration extraction unit 16 that extracts a machine configuration from parameter information of the machine tool 4, an axis information extraction unit 17 that extracts axis information from the parameter information of the machine tool 4, and an M code information extraction unit 18 that extracts information regarding M code from the ladder program. In addition, since the internal information acquisition unit 11, the function extraction unit 12, the function comparison unit 13, and the file output unit 15 in FIG. 7 are the same as those in the first disclosure, descriptions thereof will be omitted.

The machine configuration extraction unit 16 extracts the machine configuration from the parameter information of the machine tool 4, which is the internal information of the numerical controller 3, and the like. The machine configuration can be extracted from the parameters of the machine tool 4.

Figure 8A:
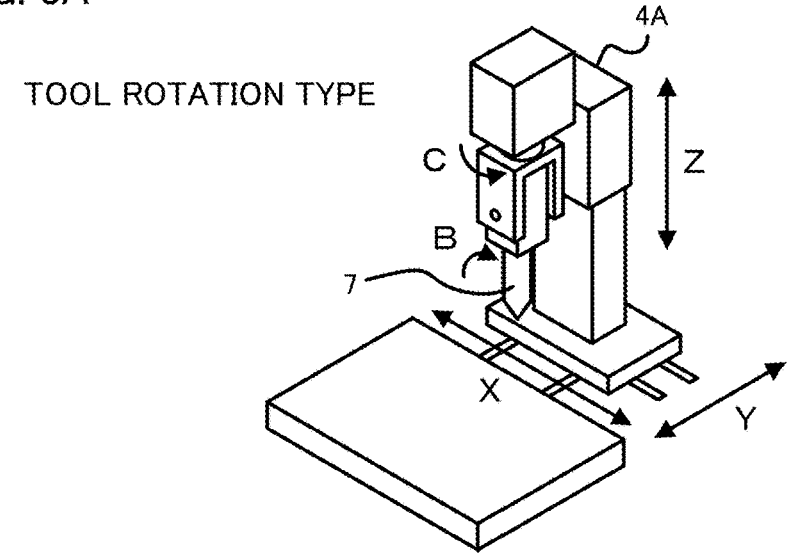
FIG. 8A is a diagram showing the machine configuration of a 5-axis machine tool.
Figure 8B:
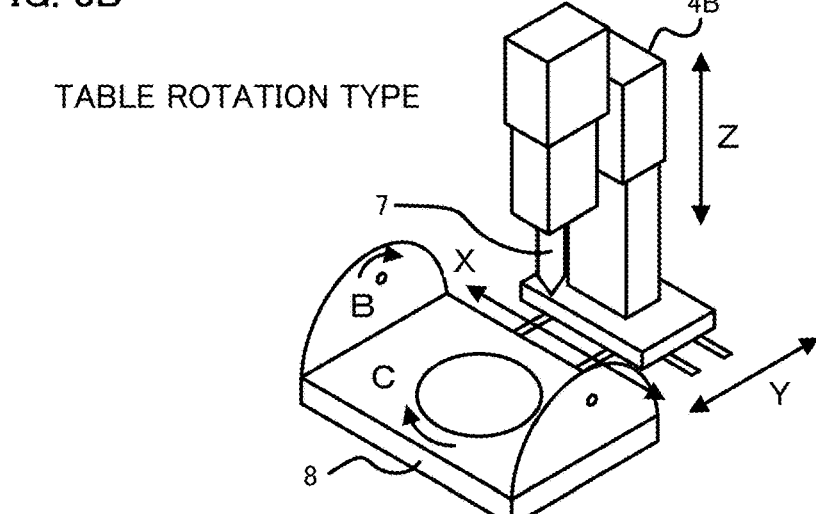
FIG. 8B is a diagram showing the machine configuration of a 5-axis machine tool.
Figure 8C:
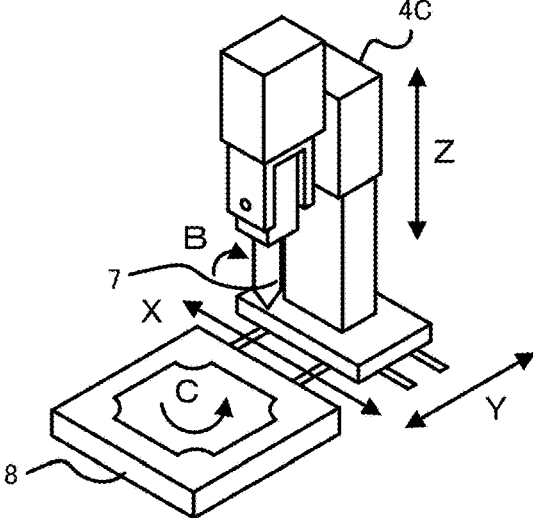
FIG. 8C is a diagram showing the machine configuration of a 5-axis machine tool.

FIGS. 8A to 8C are examples of the machine configuration. The machine tools shown in FIGS. 8A to 8C are all 5-axis machine tools 4 having X, Y, and Z axes and B and C axes, but have different machine configurations.

FIG. 8A shows a tool rotation type machine tool 4A. In the tool rotation type machine tool 4A, a tool 7 moves on the XYZ axes and rotates on the rotation axes of the C axis and the B axis. FIG. 8B shows a table rotation type machine tool 4B. In the table rotation type machine tool 4B, the tool 7 moves on the XYZ axes, and a table 8 on which a workpiece is placed rotates on the rotation axes of the C axis and the B axis. FIG. 8C shows a mixed type machine tool 4C. In the mixed type machine tool 4C, the tool 7 moves on the XYZ axes and rotates on the rotation axis of the B axis, and the table 8 on which a workpiece is placed rotates on the rotation axis of the C axis. As the 5-axis machine tool 4, there are not only the three types described above but also machine configurations with other rotation axes, such as X, Y, and Z axes and A and C axes or X, Y, and Z axes and A and B axes.

The post-processor 23 does not know the machine configuration of the machine tool 4 to be controlled. In order to create a machining program, it is necessary to set the machine configuration of the machine tool 4 to be controlled in the post-processor 23. The machine configuration extraction unit 16 automatically extracts a machine configuration from the parameters.

The axis information extraction unit 17 extracts axis information from parameter information, which is the internal information of the numerical controller 3, and the like.

The axis information necessary for creating a machining program includes the axis name, minimum command unit, operating range, maximum cutting feed speed, rollover, rotation direction of absolute command, and the like.

The axis name is a name for designating an axis to be moved in the machining program. The minimum command unit indicates a unit that can be commanded with precision up to how many digits after the decimal point when indicating the coordinates of the movement destination of the axis. The operating range is the moving range of the tool that can be specified as a movement command. The maximum cutting feed speed is a maximum cutting speed, and the speed or lower is set in the machining program. The rollover is a setting regarding whether the coordinate value of the angle returns to 0 or increases as it is when the rotation axis rotates once. The rotation direction of the absolute command is a setting regarding whether the rotation direction of the rotation axis moves clockwise or counterclockwise according to the sign of +/− or rotates by calculating a direction with less movement (close direction) when commanding the angle of the rotation axis with an absolute coordinate command. If there is a risk of interference between a machine tool and a tool, it is necessary to check whether or not the setting allows the direction of rotation to be specified.

The M code information extraction unit 18 extracts an M code created by the engineer of the numerical controller 3 from the ladder program.

The M code is an instruction for outputting a signal from the numerical controller 3 to the PLC. Some M codes, such as M03, are routinely used, but there is also an M code created by the engineer of the numerical controller. The operation of the M code created by the engineer of the numerical controller differs depending on each numerical controller.

The relationship between the M code and the operation of the machine can be determined from the M code number of the ladder program and its comment or the name of the signal changed by the M code. The M code extracted by the M code information extraction unit 18 can be used in the machining program.

The output file creation unit 14 creates a configuration file including the machine configuration extracted by the machine configuration extraction unit 16, the axis information extracted by the axis information extraction unit 17, the M code information extracted by the M code information extraction unit 18, and the list of functions that can be used by the numerical controller 3. The configuration file is a file in a format that can be read by the PC on the CAM side. The file format is, for example, a general-purpose format such as XML, CSV, TXT, and JSON.

The file output unit 15 outputs the configuration file created by the output file creation unit 14 to the PC 2. For the output of the configuration file, a wired/wireless network may be used, or a non-volatile memory such as a USB memory may be used.

In addition, as will be described later, when the post-processor development support device 1 is mounted in the PC 2 on the CAM side, the file output unit 15 internally outputs data.

As described above, the post-processor development support device 1 of the third disclosure outputs the machine configuration or axis information of the machine tool 4 and the M code information to the PC 2 including the CAM 21. Since the machine configuration or axis information of the machine tool 4 and the M code information are necessary for creating a machining program, the machine configuration or axis information of the machine tool 4 and the M code information should be set accurately. Since such information is huge, it is a heavy burden for the developer to investigate which information is to be acquired from where.

The post-processor development support device 1 of the third disclosure automatically extracts the machine configuration and axis configuration of the machine tool 4 and the M code necessary for the development of the post-processor 23 and outputs these in a format readable by the CAM 21. Therefore, since the burden on the developer is reduced and human errors are reduced, development efficiency is improved.

[Mounting of a Post-Processor Development Support Device]

The post-processor development support device 1 may be mounted in a general information processing apparatus such as a PC 5, may be mounted in the numerical controller 3, or may be mounted in the PC 2 in which the CAM 21 is mounted. The post-processor development support device 1 shown in FIGS. 9A to 9C is mounted by the CPU 111 executing a predetermined program.

Figure 9A:
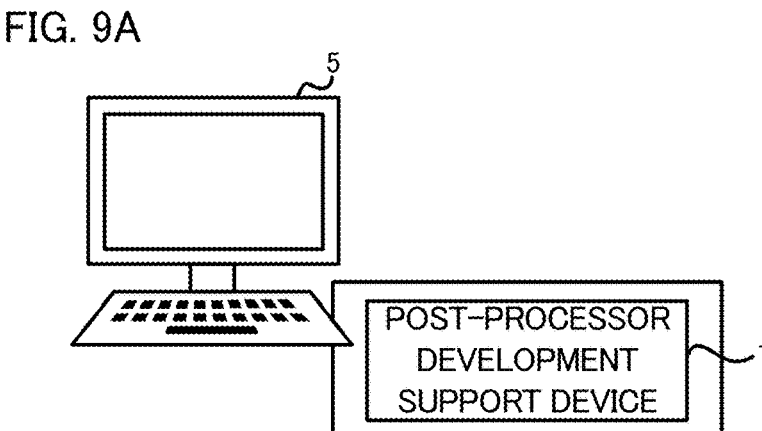
FIG. 9A is a diagram showing a mounting example of a post-processor development support device.
Figure 9B:
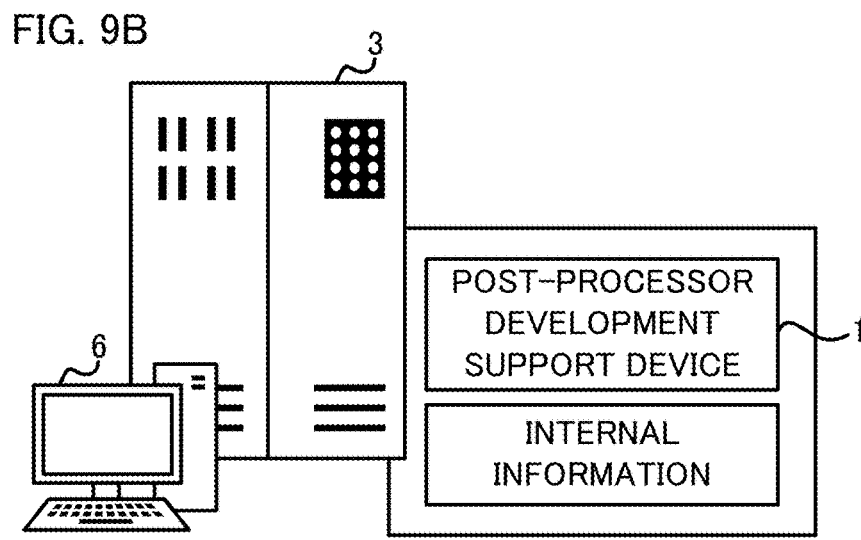
FIG. 9B is a diagram showing a mounting example of a post-processor development support device.

In FIG. 9A, the post-processor development support device 1 is mounted in a general information processing apparatus, such as the PC 5. In FIG. 9B, the post-processor development support device 1 is mounted in the numerical controller 3 or an IPC 6 (industrial PC). By mounting the post-processor development support device 1 in the numerical controller 3 or the IPC 6, it is possible to output files necessary for the development of the post-processor 23 without outputting internal information, which will be described later, to the outside. A non-volatile memory such as a USB memory may be used for file delivery, or Internet settings may be made. Since this eliminates the need for setting to communicate internal information, it becomes easy to output a file to the PC.

Figure 9C:
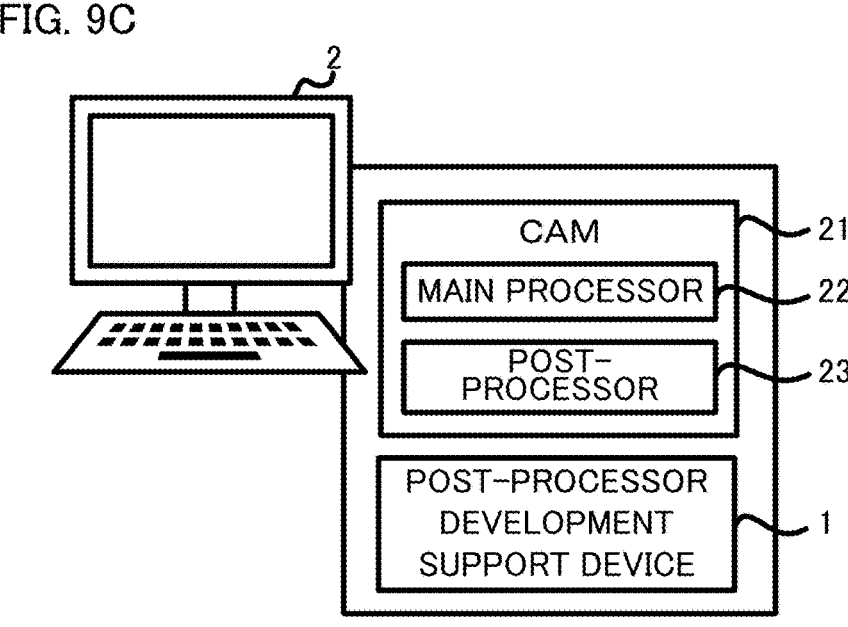
FIG. 9C is a diagram showing a mounting example of a post-processor development support device.

In FIG. 9C, the post-processor development support device 1 is mounted in the PC 2 including the CAM 21. When the post-processor development support device 1 is mounted in the PC 2 including the CAM 21, it is possible to directly take in the information of the numerical controller 3 and automatically complete the setting of the post-processor 23. Therefore, even if the numerical controller 3 does not have a development support function for the post-processor 23, it is possible to set the post-processor 23 on the PC 2 side.

EXPLANATIONS OF LETTERS OR NUMERALS

100 POST-PROCESSOR DEVELOPMENT SUPPORT SYSTEM
1 POST-PROCESSOR DEVELOPMENT SUPPORT DEVICE
2 PC INCLUDING CAM
3 NUMERICAL CONTROLLER
4 MACHINE TOOL
5 POST-PROCESSOR DEVELOPMENT SUPPORT UNIT
11 INTERNAL INFORMATION ACQUISITION UNIT
12 FUNCTION EXTRACTION UNIT
13 FUNCTION COMPARISON UNIT
14 OUTPUT FILE CREATION UNIT
15 FILE OUTPUT UNIT
16 MACHINE CONFIGURATION EXTRACTION UNIT
17 AXIS INFORMATION EXTRACTION UNIT
21 CAM
22 MAIN PROCESSOR
23 POST-PROCESSOR

The invention claimed is:

1. A post-processor development support device, comprising:

a processor configured to:
acquire internal information of a numerical controller;
extract functions usable by the numerical controller based on the internal information, wherein
the functions include
a basic function usable by the numerical controller, and
additional functions usable by the numerical controller added to the basic function by a user, and
in response to two or more of the additional functions having an exclusive relationship with another function of the functions,
one of the two or more of the additional functions having the exclusive relationship is enabled, remaining of the two or more of the additional functions having the exclusive relationship is disabled, and the one of the two or more of the additional functions is extracted;

in response to the extracted functions including similar functions, compare the similar functions with each other, and select appropriate functions among the similar functions;

create a list of functions based on the extracted functions and the selected appropriate functions;

create a configuration file by converting the list of functions into a file having a format readable by a post-processor to create a configuration file; and output the configuration file to the post-processor.

2. The post-processor development support device according to claim 1, wherein the internal information includes information regarding the numerical controller and parameter information of a machine tool controlled by the numerical controller, and the processor is configured to extract the basic function usable by the numerical controller based on the information regarding the numerical controller and the parameter information.

3. The post-processor development support device according to claim 1, wherein the internal information includes option information added to the numerical controller, and the processor is configured to extract the additional functions usable by the numerical controller based on the option information.

4. The post-processor development support device according to claim 1, wherein the processor is further configured to:

extract a machine configuration of a machine tool controlled by the numerical controller based on the internal information, and output the configuration file including the machine configuration to the post-processor.

5. The post-processor development support device according to claim 1, wherein the processor is further configured to:

extract axis information of a machine tool controlled by the numerical controller based on the internal information, output the configuration file including the axis information to the post-processor.

6. The post-processor development support device according to claim 1, wherein the processor is further configured to:

extract an auxiliary function usable by the numerical controller based on the internal information, output the configuration file including the auxiliary function to the post-processor.

7. The post-processor development support device according to claim 6, wherein the auxiliary function includes an instruction to control mechanical phenomena or operations surrounding a machine tool controlled by the numerical controller.

8. A post-processor development support system, comprising:

a processor configured to:

acquire internal information of a numerical controller;

extract functions usable by the numerical controller based on the internal information, wherein the functions include a basic function usable by the numerical controller, and additional functions usable by the numerical controller added to the basic function by a user, and in response to two or more of the additional functions having an exclusive relationship with another function of the functions, one of the two or more of the additional functions having the exclusive relationship is enabled, remaining of the two or more of the additional functions having the exclusive relationship is disabled, and the one of the two or more of the additional functions is extracted;

in response to the extracted functions including similar functions, compare the similar functions with each other, and select appropriate functions among the similar functions;

create a list of functions based on the extracted functions and the selected appropriate functions;

create a configuration file by converting the list of functions into a file having a format readable by a post-processor to create a configuration file; and output the configuration file to the post-processor.

9. A computer-executable method, comprising:

acquiring internal information of a numerical controller;

extracting functions usable by the numerical controller based on the acquired internal information, wherein the functions include a basic function usable by the numerical controller, and additional functions usable by the numerical controller added to the basic function by a user, wherein in response to two or more of the additional functions having an exclusive relationship with another function of the functions, one of the two or more of the additional functions having the exclusive relationship is enabled, remaining of the two or more of the additional functions having the exclusive relationship is disabled, and the one of the two or more of the additional functions is extracted;

in response to the extracted functions including similar functions, comparing the similar functions with each other, and selecting an appropriate function among the similar functions;

creating a list of functions based on the extracted functions and the selected appropriate functions;

creating a configuration file by converting the list of functions into a file having a format readable by a post-processor to create a configuration file; and outputting the configuration file to the post-processor.

* * * * *